US008880607B1

(12) United States Patent
Merom et al.

(10) Patent No.: US 8,880,607 B1
(45) Date of Patent: Nov. 4, 2014

(54) GENERATING SUGGESTIONS FOR USER GROUPS IN SOCIAL NETWORKS

(71) Applicant: Google Inc., Mountain View, CA (US)

(72) Inventors: Ron Merom, Qiryat Bialik (IL); Avinatan Hassidim, Petah Tikva (IL); Yossi Matias, Tel Aviv (IL); Alon Mittelman, Tel Aviv (IL); Tal Uziely, Mevasseret Zion (IL); Hilly Meerovitch, Kefar Shemaryahu (IL); Tzvi Itzhak Barenholz, Raanana (IL); Sigalit Bar, Cupertino, CA (US); Ari J. Leichtberg, Zichron Yaakov (IL)

(73) Assignee: Google Inc., Mountain View, CA (US)

( * ) Notice: Subject to any disclaimer, the term of this patent is extended or adjusted under 35 U.S.C. 154(b) by 228 days.

(21) Appl. No.: 13/656,425

(22) Filed: Oct. 19, 2012

Related U.S. Application Data

(60) Provisional application No. 61/550,036, filed on Oct. 21, 2011.

(51) Int. Cl.
*G06F 15/16* (2006.01)
(52) U.S. Cl.
USPC ............................ 709/204; 709/200; 705/319
(58) Field of Classification Search
USPC ............................ 709/200, 204, 217; 705/319
See application file for complete search history.

(56) References Cited

U.S. PATENT DOCUMENTS 8,521,661 B2     8/2013   Wang et al.
8,751,521 B2 *   6/2014   Lee et al. ...................... 707/767
2008/0040428 A1  2/2008   Wei et al.
2009/0271370 A1  10/2009  Jagadish et al.
2013/0165234 A1* 6/2013   Hall et al. ...................... 463/42
2014/0025702 A1* 1/2014   Curtiss et al. .................. 707/769

OTHER PUBLICATIONS

Thomas Erickson et al., "Social Translucence: Using Minimalist Visualizations of Social Activity to Support Collective Interaction," Designing Information Spaces: The Social Navigation Approach (eds. K. Höök, D. Benyon, A Munroe), Springer-Verlag: London, 2003, pp. 17-41.

Marc Steen et al., "Development of we-centric, context-aware, adaptive mobile services requires empathy and dialogue," Freeband Frux, 2005, 4 pages.

(Continued)

*Primary Examiner* — El Hadji Sall
(74) *Attorney, Agent, or Firm* — Fish & Richardson P.C.

(57) ABSTRACT

Implementations of the present disclosure include generating one or more suggested social circles based on an analysis of past user interactions. The user can accept the suggested social circle and use it to distribute digital content. Generating a suggested social circle can include determining, for each of various sets of contacts, an initial score that represents a strength of the particular user's affinity to the set as a whole based on prior interactions of the particular user with the set, and determining, for each member of each set, an individual score that represents an average strength of the particular user's affinity to the member based on the interactions. An overall score for each set is calculated based on the initial score for the set and the individual scores of each member in the set. Based on the overall scores, at least one of the sets is identified for presentation as a suggested social circle to the particular user. Social circle data corresponding to the suggested social circle is transmitted to display a representation of the suggested social circle on a client device associated with the particular user.

28 Claims, 6 Drawing Sheets

(56) References Cited

OTHER PUBLICATIONS

Ronald van Eijk et al., "We-centric, context-aware, adaptive mobile service bundles," Telematica Instituut, Freeband Frux D1.1, Nov. 30, 2004, 48 pages.

Andrew Leonard, "You are who you know," Salon Media Group, Inc., Jun. 15, 2004, 15 pages.

Junichiro Mob et al., "Real-world Oriented Information Sharing Using Social Networks," Proceedings of the 2005 International ACM SIGGROUP Conference on Supporting Group Work (Group 05), Nov. 6-9, 2005, pp. 81-84.

Alice Emily Marwick, "Selling Your Self: Online Identity in the Age of a Commodified Internet," Thesis for degree of Master of Arts, University of Washington, 2005, 192 pages.

Jeffrey Neer et al., "Vizster: Visualizing Online Social Networks," IEEE Symposium on Information Visualization (INFOVIS 2005), Oct. 23-25, 2005, pp. 32-39.

* cited by examiner

GENERATING SUGGESTIONS FOR USER GROUPS IN SOCIAL NETWORKS

CROSS-REFERENCE TO RELATED APPLICATION

Under 35 U.S.C. §119(e)(1), this application claims the benefit of prior U.S. provisional application 61/550,036, filed Oct. 21, 2011. The contents of U.S. provisional application 61/550,036 are hereby incorporated by reference into this patent application as if set forth herein in full.

TECHNICAL FIELD

This specification generally relates to generating suggestions of user groups in social networks.

BACKGROUND

Electronic social networks are network-based services that provide users with an ability to associate and communicate with each other. Users are able to identify other users with whom they have a social relationship (e.g., establishing other users as contacts within a social networking service). Once a social relationship has been expressed, the users typically are able to see communications, status updates, and other notifications generated by the social networking activities of their contacts.

Social networks also provide services that enable users to identify and associate with groups of other users who share a common interest. Some groups are manually created by a user, and other users are then able to choose to associate themselves with the group. In some cases, membership is open where users are granted membership in the group upon request. In other cases, membership is moderated where one or more users manually decide to accept or deny other users' requests for membership.

SUMMARY

According to one innovative aspect of the subject matter described in this disclosure, a grouping of contacts, discussed herein as a suggested social circle, can be dynamically generated by a social network or other system based on prior interactions among the contacts. The suggested social circle can be automatically generated and populated with each of the one or more contacts, and can be presented to one or more users. The suggested social circle can be used to define a distribution of digital content through a social networking service.

In general, another innovative aspect of the subject matter described in this disclosure may be embodied in methods that include the actions of identifying contacts who previously have had interactions through one or more communications networks with a particular user during a specified period of time. The methods can include generating different sets of contacts, wherein each set consists of one or more of the identified contacts. For each of the sets, an initial score is determined, where the initial score represents a strength of the particular user's affinity to the set as a whole based on the interactions. The methods also include, determining, for each member of each set, an individual score that represents an average strength of the particular user's affinity to the member based on the interactions. For each of the sets, an overall score for the set is calculated based on the initial score for the set and the individual scores of each member in the set. Based on the overall scores of the sets, at least one of the sets is identified for presentation as a suggested social circle to the particular user. The methods include causing social circle data corresponding to the suggested social circle to be transmitted to display a representation of the suggested social circle on a client device associated with the particular user.

These and other implementations may each optionally include one or more of the following features. For instance, the operation of identifying contacts who previously had interactions with the particular user during the specified period of time can be based on interactions that included use of at least one of the following: an electronic post, an online forum, or a social networking website. In some implementations, the initial score increases as the number of times the particular user interacted with the set as a whole increases. Also, interactions in which the particular user took an active role can be weighted more heavily in determining the initial score than interactions in which the particular user has a passive role, and when determining the initial score, more recent interactions can be weighted more heavily. The interactions can include different types of interactions and, when determining the initial score, each interaction can be weighted based at least in part on the type of interaction.

In some implementations, the individual score of a particular member of a set is based on a weighted sum of the initial scores for all the sets that include the particular member. The individual score for a particular member of a set can increase as the number of times the particular user interacted with a set that contains the particular member increases. Also, in some implementations, interactions in which the particular user took an active role can be weighted more heavily in determining the individual score than interactions in which the particular user did not take an active role, and when determining the individual score of a particular member, more recent interactions can be weighted more heavily.

The overall score for a set can be based on a weighted average of the initial score for the set and the individual scores for each member of the set. In some implementations, the operations include determining an extent of overlap between a particular one of the sets and existing social circles for the particular user, and identifying the particular one of the sets for presentation as the suggested social circle only if the extent of overlap is determined to be less than a predetermined threshold. The extent of overlap can be based, for example, on a ratio of (i) a size of intersection of the particular one of the sets and the particular user's existing social circles and (ii) a size of union of the particular one of the sets and the particular user's existing social circles. In some implementations, the extent of overlap can be based on a ratio of (i) a size of intersection of the particular one of the sets and the particular user's existing social circles as well as social circles previously suggested to the particular user and (ii) a size of union of the particular one of the sets and the particular user's existing social circles as well as social circles previously suggested to the particular user.

Other implementations of this aspect include corresponding systems, apparatus, and computer programs, configured to perform the actions of the methods, encoded on computer storage devices.

Particular implementations of the subject matter described in this specification may be used to realize one or more of the following, example advantages. In some implementations, social circles to define distribution of digital content can be automatically created for users of a social networking service. In some implementations, social connections can be identified such that users can become aware and take advantage of indirect social connections in the context of a social networking service that are more reflective of varying levels of real-world social interactions. In some implementations, users of a social networking service are able to share specific pieces of content with appropriate ad-hoc social circles that are presented. Implementations of the subject matter described in this specification may be used to realize other advantages not specifically discussed herein.

The details of one or more implementations of the subject matter described in this specification are set forth in the accompanying drawings and the description below. Other potential aspects, features and advantages of the subject matter will become apparent from the description, the drawings, and the claims.

DETAILED DESCRIPTION

Implementations of the present disclosure are generally directed to dynamic generation of a grouping of contacts, discussed herein as a social circle, based on past interactions a user has had with other proposed members of the social circle. Information about the past interactions is processed to identify one or more contacts and a suggested social circle is generated automatically by the social network system, e.g., generated without further user intervention, that includes the one or more contacts as members of the suggested social circle. The system-suggested social circle can be proposed to the user and used to define a distribution of digital content through a social networking service. For example, the system-suggested social circle provides a list of one or more contacts, to which digital content can be distributed. In some implementations, the system-suggested social circle persists, such that a user can use the social circle multiple times to distribute digital content. In some implementations, the system-suggested social circle is temporary, such that the user can use the social circle once to distribute digital content.

In general, social circles are categories or groupings to which a user can assign their contacts (e.g., members of a social network in which the user belongs, other contacts of the user) and better control the distribution and visibility of digital content (e.g., social networking posts). A social circle can be provided as a data set defining a collection of contacts that may have some association with one another. Generally, a social circle can be described from the perspective of an individual that is the center of a particular collection of socially interconnected people, or from the aggregate perspective of a collection of socially interconnected people. In some implementations, a social circle can have narrowly defined boundaries, all of the members of the social circle are at least familiar with one another, and permission may be required for a member to join a social circle. In some implementations, a social circle can have broadly defined boundaries where, for example, only some of the members are familiar with one another, but there is a commonality among all members (e.g., ride the same bus, are at the same location, are attending the same event, frequent the same locations, partake in the same activities).

In some implementations, a social circle provides a distribution list that defines which users receive or are otherwise allowed to access digital content. Example digital content can include textual content (e.g., posted text), status updates (e.g., busy, available, offline, check-in status), images, videos, hyperlinks and the like. In some implementations, the digital content can include a corresponding access control list (ACL), discussed in further detail below, that defines which users are to receive and/or are able to access the digital content.

Through the creation and use of social circles, the user can organize and categorize contacts into various different groupings that can be used to control the visibility and access those contacts have to the user's digital content (e.g., postings, digital pictures, videos, audio files, hyperlinks (e.g., uniform resource indicators (URIs)), and/or other content associated with the user's social networking profile). In some examples, the user can post an update about or a photo taken at an event to only an "event" circle, and spare other contacts from seeing information that may not be relevant to them.

In accordance with the present disclosure, one or more social circles can be suggested to a user based on past interactions among the potential members of the social circles so as to identify one or more contacts based on automatically determined affinities between the user and the contacts. In general, the suggested social circles can facilitate communication between targeted social groups that can reflect indirect, real-world social connections.

A social network system can search data to identify one or more other persons who previously have interacted with a particular user through one or more communication systems. The suggested social circle(s) can be based on such past user interactions. In some implementations, the data that is used to identify one or more other persons includes data that is specifically authorized by a user for such use. For example, one or more users (e.g., the particular user and/or the one or more other persons) can authorize data relating to past user interactions to be used for identifying the one or more other persons who previously have interacted with the particular user, as discussed herein.

Electronic social networking services can be used as tools for building and maintaining networks of personal, familial, academic, professional, and other interpersonal relationships. Real-life social networks also include dynamically shifting relationships in which tangential social contacts may be united through common behaviors (e.g., communicating through social networking services).

In another example, the social network system may determine that a number of posts, photos or other information has been shared electronically among a group of users. In response, the system can generate a suggested social circle based, at least in part, on such interactions.

Figure 1:
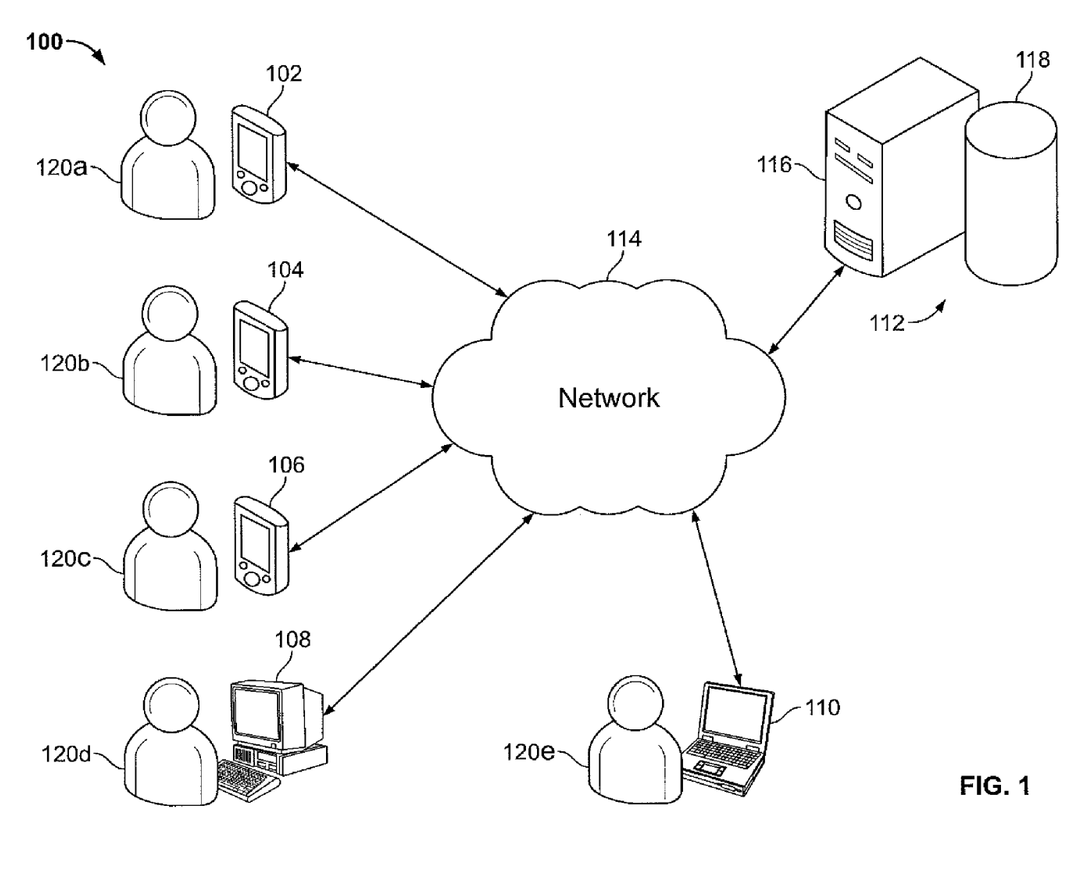
FIG. 1 depicts an example system that can execute implementations of the present disclosure.

FIG. 1 is a diagram of an example network architecture 100 that can execute implementations of the present disclosure. The network architecture 100 includes a number of client devices 102-110 communicably connected to a server device 112 by a network 114. The server device 112 includes a processing device 116 and a data store 118. The processing device 116 executes computer instructions (e.g., social network computer program code) stored in the data store 118 to perform the functions of a social network server.

A number of users 120a-120e of the client devices 102-110, respectively, access the server device 112 to participate in a social networking service. For example, the client devices 102-110 can execute web browser applications that can be used to access the social networking service. In another example, the client devices 102-110 can execute software applications that are specific to the social network (e.g., social networking "apps" running on smartphones).

The users 120a-120e can participate in the social networking service provided by the server device 112 by posting information, such as text comments (e.g., updates, announcements, replies), digital photos, videos, or other appropriate electronic information. In some implementations, information can be posted on a user's behalf by systems and/or services external to the social network or the server device 112. For example, the user 120a may post a review of a movie to a movie review website, and with proper permissions that website may cross-post the review to the social network on the user's 120a behalf. In another example, a software application executing on a mobile device, with proper permissions, may use global positioning system (GPS) capabilities to determine the user's location and automatically update the social network with his location (e.g., "At Home", "At Work", "In Brownsdale, Minn.").

Users 120a-120e interacting with the client devices 102-110 can also use the social network provided by the server device 112 to define social circles to organize and categorize the users' 120a-120e relationships to other users of the social network. Examples of the creation and use of social circles are provided in the description of FIG. 2, and throughout the remainder of the present disclosure.

In some implementations, the client devices 102-110 can be computing devices such as laptop or desktop computers, smartphones, personal digital assistants, portable media players, tablet computers, or other appropriate computing devices that can be used to communicate with an electronic social network. In some implementations, the server device 112 can be a single computing device such as a computer server. In some implementations, the server device 112 can represent more than one computing device working together to perform the actions of a server computer (e.g., cloud computing). In some implementations, the network 114 can be a public communication network (e.g., the Internet, cellular data network, dialup modems over a telephone network) or a private communications network (e.g., private LAN, leased lines).

Figure 2:
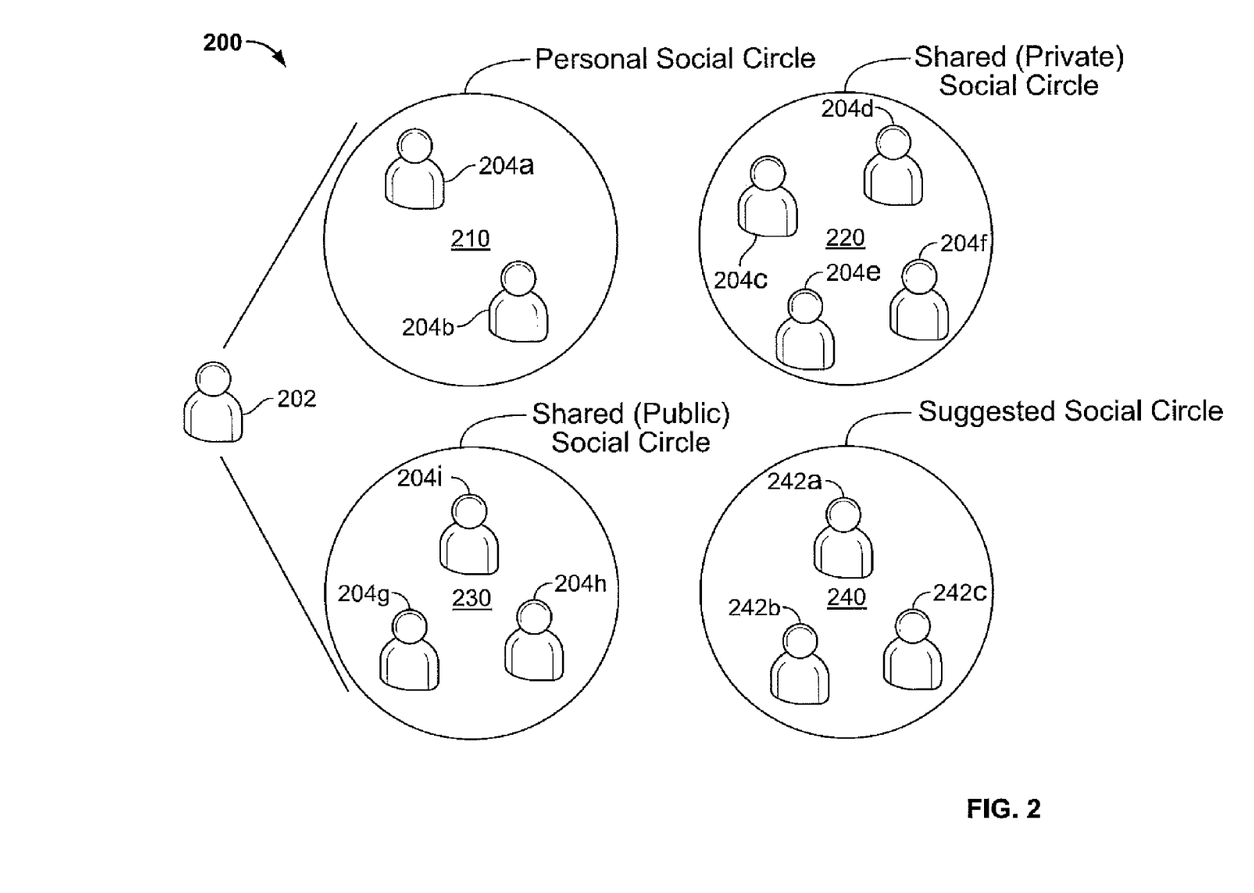
FIG. 2 is a diagram of an example social network including social circles.

FIG. 2 is a diagram of an example social network 200 including social circles. A user 202 is a member of a social network that supports the creation and use of social circles (e.g., the social network provided by the server device 112 of FIG. 1). In the present example, the user 202 has a number of contacts 204a-204i with which the user 202 can have some form of relationship (e.g., friends, coworkers, customers, teammates, clients, relatives, club members, classmates). The user 202 categorizes the contacts 204a-204i by assigning them to one or more social circles, such as a social circle 210, a social circle 220, and a social circle 230. A social circle 240, which has a number of contacts 242a-242c, is provided as a system-suggested social circle that can be automatically generated without input from the user 202. The social circle 240 can be generated, for example, based on information about prior interactions between the user 202 and the users 242a-242c (e.g., electronic posts, uploaded photos, online forums, discussion forums, interactions through social networking websites and contact lists, and/or other interactions authorized by the users for such use).

The social circle 210 is a personal social circle. In some implementations, personal social circles are groupings created by the user 202 and may be known only to the user 202 (e.g., the contacts 204a, 204b may receive no indication that they are in the user's 202 personal social circle 210). In some implementations, personal social circles are groupings created by the user 202 and may be known to the user 202 as well as the contacts (e.g., contacts 204a, 204b) that are members of the social circle (e.g., the contacts 204a, 204b receive an indication that they have been added to the personal social circle 210).

In some implementations, personal social circles may be used to organize and categorize the contacts 204a-204i in ways that are relevant to the user 202. In some implementations, the user 202 may use personal social circles to organize contacts in order to discretely target which of his contacts 204a-204h will see certain postings or have access to particular information. For example, the user 202 may be planning a surprise party for a small group of friends. As such, the user can organize contacts into "Surprise Party Attendees" and "Surprise Party Honorees" personal social circles. By doing so, the user 202 may better target selected postings to the friends attending and/or helping to plan the surprise party (i.e., Surprise Party Attendees), while targeting selected postings to friends that are to be honored at the surprise party (i.e., Surprise Party Honorees) to maintain the integrity of the surprise.

The social circle 220 is a shared private social circle, which may also be referred to simply as a shared circle. In general, shared private social circles are social circles that the user 202 creates and invites contacts to join voluntarily. Contacts that accept the invitation become members of the shared private social circle. Members of a shared private social circle can see information posted to that circle by the user 202 and can post information to be shared with other members of the shared private social circle. For example, the user 202 may tend to post a large number of jokes to the social network. However, while some of the contacts 204a-204i may find the jokes to be entertaining, others may find them to be simply annoying. Realizing this, the user 202 may create a "jokes" shared private social circle and invite some or all of the contacts 204a-204i to join. With the "jokes" social circle in place, the user 202 may post witticisms to the "jokes" circle, and only those contacts who have accepted the invitation are able to see the user's 202 comicality. Similarly, members of the shared private social circle are able to post messages to the circle, and those posts are visible to other members of that circle.

The social circle 230 is a shared public circle. In general, shared public circles are social circles that the user 202 creates, and invites contacts to join voluntarily. Further, the existence of a shared public circle is publicly available such that other users of the social networking service (e.g., not necessarily just the user's 202 contacts 204a-204i) may request to join the public social circle. Members of shared public circles may post information to, and see updates posted by, other members of the same public shared circle. In some implementations, public shares circles may be "fan" or "group" circles (e.g., circles dedicated to a particular place, event, product, movie, celebrity, sports team, company, concept, philosophy, organization, support network). For example, the user 202 may create a shared public circle for his band, and fans of his act may join the circle to discuss upcoming shows, download music of the band's music, or post videos from recent concerts. In another example, the user 202 may create a shared public circle for alumni of his high school graduating class, which his former classmates may find and join in order to stay in touch with one another and post pictures from their school days. Once a shared public circle is created, in some implementations the user 202 can invite people to join the circle. In some implementations, nonmembers of the circle can request membership in the shared public circle, and membership in a shared public circle may be automatic upon request, or may require the user's 202 approval to become members of the shared public circle.

The suggested social circle 240 can be generated automatically based on past interactions between users of the social networking service. For example, one type of interaction occurs if the user 202 uploads and shares photos with all or some of the other users 204a-204i. In another example, social networking posts by the user 202 can be analyzed to determine which of the other users 204a-204i looked at the information in the posts.

Users of a social networking service can voluntarily submit information to the social networking service for sharing such information with other users of the social networking service. Such information can include, for example, a textual post, a status update, a digital image, a check-in status, a digital video. Other information can be submitted to the social networking service. In some examples, a timestamp can be associated with each piece of information submitted by a user (e.g., a timestamp can be generated and associated with a user status update corresponding to the time at which the user submitted the status update). This information as well as information regarding any interactions among the users can be stored to a central repository such as the data store 118 of FIG. 1. As discussed herein, the social networking service can process the user information stored in the central repository to generate one or more suggested social circles, which can be presented to users of the social networking service.

The social networking system can generate one or more suggested social circles based on an analysis of past user interactions. The suggested social circle can be pre-populated with particular contacts identified by the social networking system. Users associated with the contacts can be invited to use the social circle. The user can accept the suggested social circle and use it to distribute digital content. In some implementations, a user can opt into or opt out of being presented with suggested social circles for use in distributing digital content, and/or being a member of a suggested social circle, including having associated data processed for use in determining suggested social circles. In some implementations, a user can explicitly authorize types of data that can be used for generating suggested social circles. Example types of data can include data associated with electronic interactions over a network (e.g., electronic posts, uploaded photos, online forums, discussion forums, interactions through social networking websites and contact lists, and/or other interactions).

Figure 3:
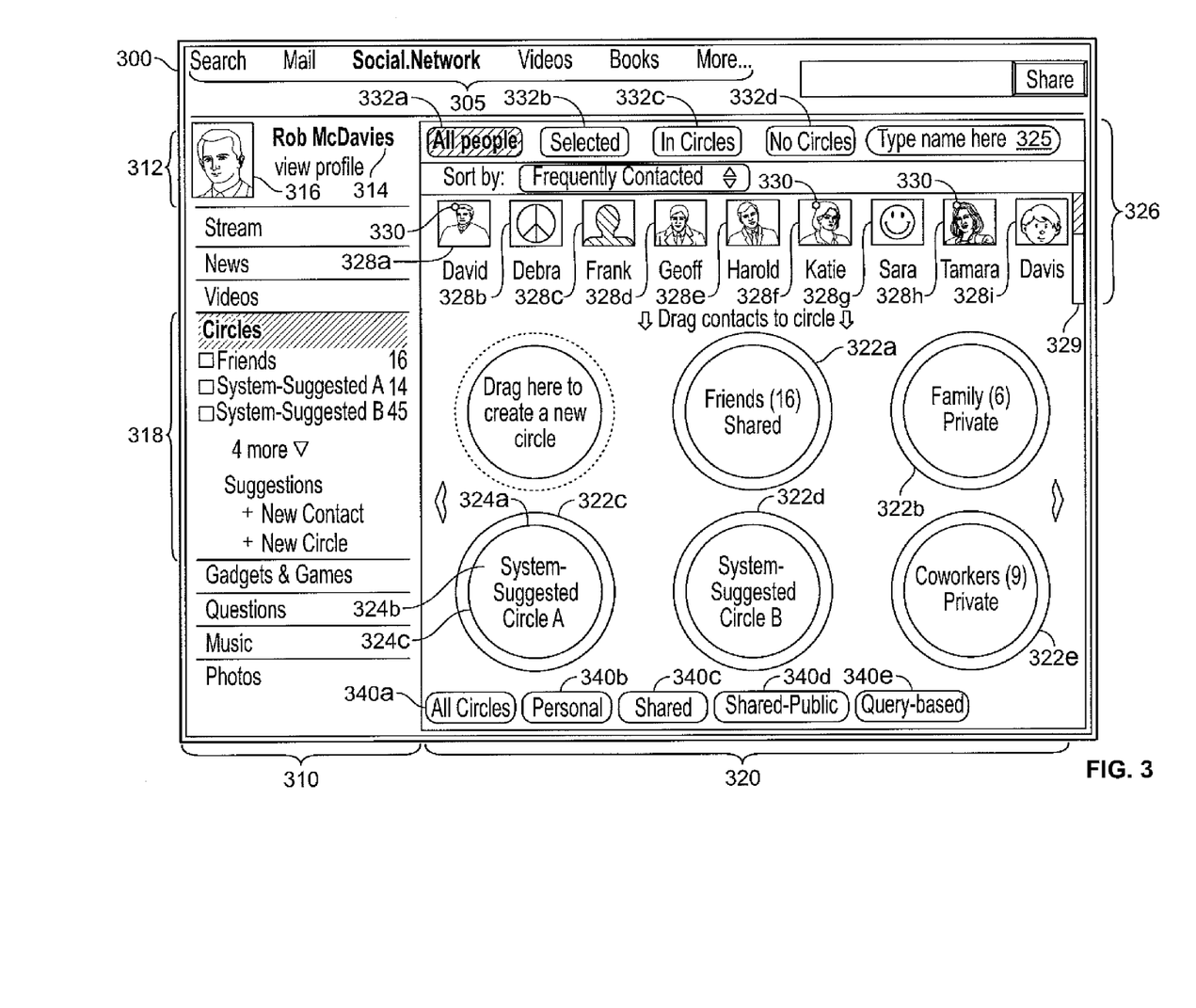
FIG. 3 depicts an example graphical user interface for creating and maintaining social circles using an example social networking service.

FIG. 3 depicts an example graphical user interface (GUI) 300 for creating; editing and/or maintaining social circles. The GUI 300 can provide a social graph editor user interface (UI). In some implementations, the UI 301 can be an interface presented by a purpose made social networking application, while in some implementations the UI 301 can be one or more web pages of a social networking website displayed in a general purpose web browser.

The UI 301 includes a number of selectable links presented in a menu bar 305. In the present example, the "Social Network" link has been selected by a user. This selection causes a web-based social networking application to be executed and a social network menu 310 to be displayed. The social network menu 310 includes a profile indicator 312 in which information such as a user name 314 and a user image 316 associated with the currently logged in user (Rob McDavies) are displayed.

The social network menu 310 also displays, among other items, a circles submenu 318. The circles submenu 318, when selected (e.g., as represented by the highlighting of the submenu's title), causes a social circle display 320 to be displayed. The social circle display 320 includes a number of social circle representations 322a-322e that are visual representations of various social circles that the user has created or is able to interact with. Each of the social circle representations 322a-322e displays information about the social circle it represents. For example, the social circle representation 322c displays a name 324a (System-Suggested Circle A), a count 324b of the number of contacts associated with the social circle, and an indication of what type of social circle that the social circle representation is representative of (e.g., system-suggested, personal, private shared, public shared).

The social circle display 320 also includes a contact display 326. The contact display 326 provides a graphical interface for viewing, selecting, and organizing items in the user's contact lists. A collection of contact icons 328a-328i represents the contacts or other entities (e.g., organizations, places, or other items) socially networked with the particular user. In some implementations, the icons can be digital images of the contacts that are represented (e.g., the icons 328a, 328d), arbitrary images (e.g., the icons 328b, 328g), or placeholders (e.g., when the contact has no image associated with their account, such as the icon 328c). Contacts who are members of one or more of the user's social circles are identified by an indicator 330 superimposed upon the icons (e.g., the icons 328a, 328f, 328h). A scroll bar 329 is provided for the user to access additional contact icons that may not fit into the initial view.

A collection of filter buttons 332a-332d is provided to select subsets of the user's contacts. The "all people" filter button 332a, when selected, causes the contact display 326 to display the user's contacts with substantially no filtering. The "selected" filter button 332b, when selected, causes the contact display to display only the contacts that have been selected by the user. For example, the user may select multiple contacts while in an "all people" view, and then display only selected contacts by pressing the "selected" filter button 332b. The "in circles" filter button 332c, when selected, causes the contact display 326 to display substantially only the contacts who share at least one social circle with the user. The "no circles" filter button 332d, when selected, causes the contact display 326 to display substantially only the contacts that is not in a social circle with the user. A search input box 325 is provided so the user can type in all or part of a name, and the resulting matches will appear in the contact display 326.

The social circle display 320 also includes a collection of social circle filter buttons 340a-340d. The "all circles" button 340a, when selected, causes the social circle display 320 to display representations of substantially all of the social circles that the user is able to interact with. The "personal" button 340b, when selected, causes the social circle display 320 to display representations of substantially only the user's personal social circles. The "shared" button 340c, when selected, causes the social circle display 320 to display representations of substantially only the user's shared private social circles. The "shared-public" button 340d, when selected, causes the social circle display 320 to display representations of only the user's shared public circles. The "suggested" button 340e, when selected, causes the social circle display 320 to display only representations of social circles that were suggested to the user by the social network system.

The social circle representations 322c and 322d are graphical representations of social circles suggested to the user by the social network system, such as the social circle 240 of FIG. 2. In the illustrated example, the social circle representation 322c represents a first suggested social circle and the social circle representation 322d represents a first suggested social circle In some implementations, the social circle display 320 can present one or more system-suggested social circles that have been determined to have an estimated greatest relevance to the user. For example, a plurality of possible social circles can be examined as being associated with a particular user. Instead of showing all of the possible social circles that may be of interest to the particular user, the social networking service can display only a subset of the possible social circles examined. In some implementations, the possible social circles can be ranked in order based on the respective relevance scores and the top scoring (e.g., top two, top three) social circles are displayed to the user.

Figure 4:
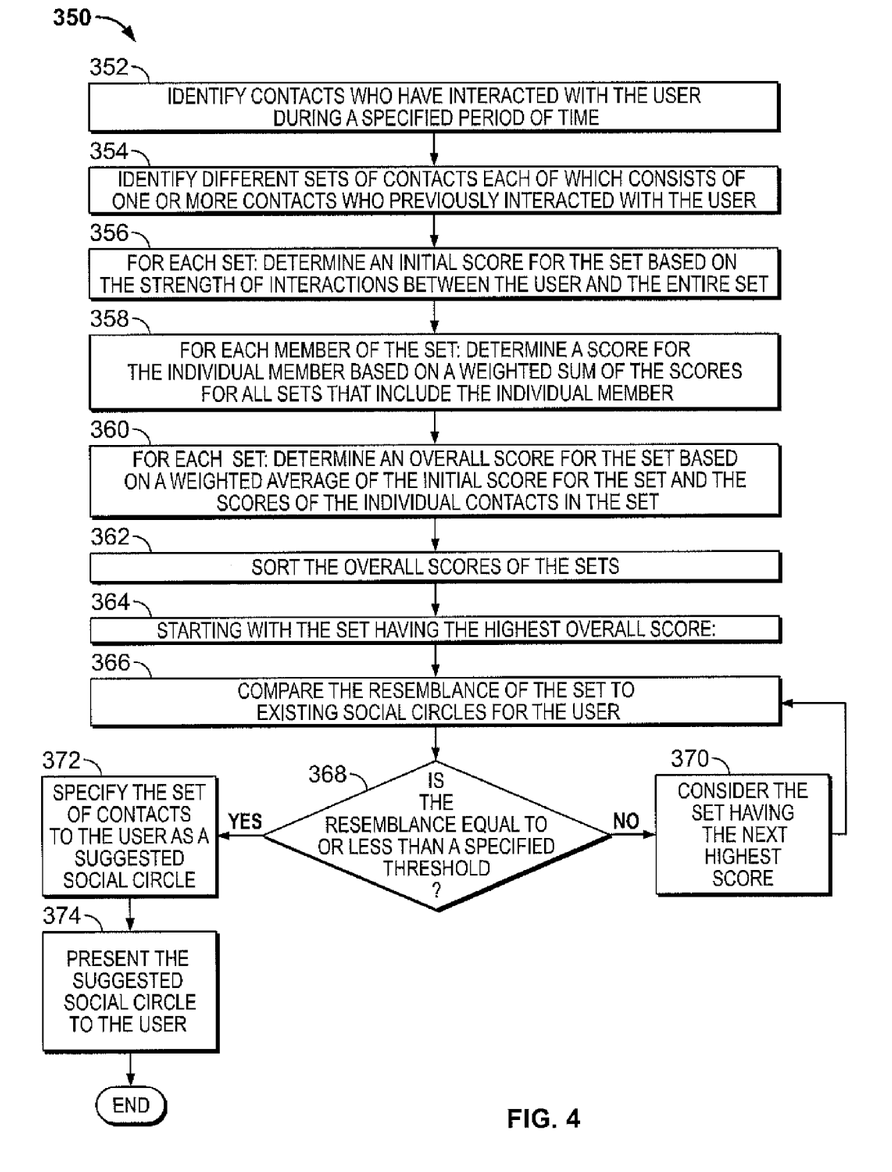
FIG. 4 is a flowchart illustrating an example process for generating system-suggested social circles in accordance with implementations of the present disclosure.

FIG. 4 is a flowchart illustrating an example process 350 for generating a system-suggested social circle within a social networking system. The process 350 can be performed, for example, by a server device, such as the server device 112 of FIG. 1. As part of the process 350, the server device 112 identifies contacts who previously have interacted with a particular user during a specified period of time, for example during the past year (352). In the illustrated example, in order to identify contacts who previously interacted with the user, the server device 112 uses only information about which the particular user already is aware or about which the user could become aware based only on the user's own data. Such a restriction may be desirable in some implementations to protect the privacy of users of the social networking system. Other implementations, however, need not be restricted to using only this type of data.

The server device 112 can take into consideration various types of prior interactions between the particular user (e.g., user 202) and other users 204a-204i. For convenience in the following discussion, some of the users may be referred to by their names (e.g., Alice for user 202; Bob and Charlie for two of the other users 204a-204i). One type of interaction that can be considered is a social networking post by Alice that is viewable to some or all of the other users (e.g., Bob and Charlie). Another example of an interaction is a social networking post by one of the other contacts (e.g., Bob) that is viewable to some or all of the other users (e.g., Alice and Charlie). Depending on the implementation, the server device 112 may consider such social networking posts regardless of whether the particular user (e.g., Alice) is specifically identified in a distribution of the post, or the post is publicly viewable. In some implementations, the server device 112 can consider other types of prior interactions, such as Alice uploading and sharing information (e.g., photos) with all or some of the contacts. Interactions by Alice can be analyzed, in some implementations, to determine which of the other users (e.g., Bob and Charlie) looked at the information in the posts. Depending on the particular implementation, the server device 112 may consider information about one or more of the foregoing types of interactions to identify contacts who previously have interacted with the particular user during the specified period of time. In some implementations, additional (or different) types of interactions, including other forms of network communications to or from the particular user (i.e., Alice, in the foregoing example) can be considered. Data about the interactions can be obtained, in some cases, from information stored in the data store 118.

After the server device 112 identifies the contacts who previously have interacted with the particular user (e.g., Alice), the server device identifies different sets of contacts, where each set consists of one or more of the contacts who previously interacted with the user (354). In some implementations, the server device 112 identifies all the possible sets consisting of one or more of the contacts. For convenience, the sets can be identified, respectively, as S_1, . . . S_t.

For example, if Alice generated a post to a social networking service that was viewable by Bob and Charlie, then Alice interacted with the set that contains Bob and Charlie. As another example, if Charlie shares a picasa album with Bob and Alice, then Alice interacted with the set that contains Charlie and Bob, even though Alice did not actively interact with Charlie and Bob. Assuming, for example, that Bob and Charlie were the only contacts identified by the server device 112 as having had prior interactions with Alice during the specified period (e.g., the past year), the server device would identify the following sets of contacts for further consideration as possible social circles to suggest to Alice:

S_1={Bob}
S_2={Charlie}
S_3={Bob, Charlie}.

In other situations, the particular user (e.g., Alice) may have previously interacted with a significantly larger greater number of contacts. In such situations, the server device 112 can identify a greater number of sets of contacts for further consideration as possible social circles to suggest to the particular user.

Next, for each set, the server device 112 determines an initial score for the set based on the strength of interactions between the user and the entire set (356). This initial score represents the strength of the affinity of the particular user (e.g., Alice) to the set as a whole. In some implementations, the strength of the interactions increases as the number of situations in which the user (e.g., Alice) interacted with all members of the set increases. Likewise, in some implementations, the strength of the affinity increases if the particular user (e.g., Alice) took an active role in the interactions (e.g., if Alice sent a social networking post to the entire set, rather than if she simply was one of the recipients of a social networking post from one of the other members of the set). Also, in some implementations, the strength of the affinity increases for more recent interactions. In determining the initial score for the set, only interactions which involved all members of the set are considered. In some implementations, the initial score of a set S for a particular user (e.g., Alice) uses a decaying count that can be calculated using the following formula:

$$\text{Alice-Score}(S) = \sum_{i=1}^{n} 2^{\frac{t(a_i)-t}{c_N}} \cdot w(a_i)$$

where n is the number of interactions that involved Alice and all members of the set, and where the individual interactions are denoted $a_i \ldots a_n$. In this example, t is the elapsed time (e.g., number of seconds) since the beginning of the specified time period, and $t(a_i)$ is the elapsed time since the interaction $a_i$ occurred. The value $c_N$ is a normalization constant that indicates how fast the decay is (i.e., so as to weight recent interactions more heavily than more distant interactions). The value of $c_N$ may depend on the particular implementation.

The value $w(a_i)$ represents a weight for the particular interaction $a_i$ and depends, in this example, on the particular type interaction. For example, if the interaction is a social networking post by Alice and the recipient list is the set S, the weight might be accorded a value of one in some implementations, whereas if the interaction is social networking post by a member of the set S to Alice and to the other members of the set S, then the weight might be accorded a different value, e.g., a lower value. In some implementations, the weight $w(a_i)$ varies between values of zero and one hundred. Other ranges of possible weights w(a) may be appropriate for some implementations. In some implementations, the weight accorded a particular interaction may depend, at least in part, on the type of interaction and whether the particular user (e.g., Alice) took an active role or a passive role in the interaction. For example, if the particular user (e.g., Alice) plays only a passive role as a recipient of post, the weight accorded the interaction can depend on whether the particular user was listed as a primary recipient (e.g., specifically identified in a distribution for the post), or as a general recipient (e.g., a publicly viewable post). In some implementations, the weight of an interaction may depend on other factors as well.

The server device 112 also determines, for each member in the set S, a score that represents the average strength of the affinity of the user (e.g. Alice) to the particular member in the set S based on a weighted sum of the scores for all sets that include the particular member (358). Thus, the affinity of the user (Alice), for example, toward Bob is based on all interactions the user had with sets of people which contain Bob, including interactions with Bob only. Similarly, the affinity of the user (Alice) toward Charlie is based on all interactions the user had with sets of people which contain Charlie, including interactions with Charlie only. In some implementations, the strength of the affinity increases as the number of situations in which the user (e.g., Alice) interacted with a set that contains the particular member (e.g., Bob) increases. Likewise, in some implementations, the strength of the affinity increases if the user (Alice) took an active role in the interactions (e.g., Alice sent a social networking post to the particular member of the set and to other people, rather than simply being one of the recipients of a social networking post). Also, in some implementations, the strength of the affinity increases for more recent interactions. In some implementations, the user's score with respect to a particular member B of the set S (e.g., Alice's score with respect to Bob or Charlie) can be calculated using the following formula:

$$\text{Alice-Score}(B) = \sum_{S, B \in S} \frac{\text{Alice-Score}(S)}{|S|}$$

In this formula, the value of Alice-Score(S) is the initial score for the set based on the strength of interactions between the user and an entire set S, as described above. The value |S| denotes the size of the set S (i.e., the number of members in the set). The summation is taken over all sets that include the particular member B. The server device 112 calculates such a score for each member of the set S for which the original score is calculated.

The server device 112 then calculates, for each set S, an overall score for the set based on a weighted average of the initial score for the set (e.g., Alice-Score(S)) and the individual scores (e.g., Alice-Score(B)) of each member B in the set (360). In the event that the initial score of a set S is zero, then in some implementations, that set is not considered further and the overall score need not be calculated for that set. Calculating an overall score only for those sets having a non-zero initial score guarantees that a system-suggested social circle will be based on a set of contacts with whom the user (e.g., Alice) has interacted explicitly on at least some occasions.

Next, the server device 112 sorts the overall scores, for example, from highest to lowest (362). In some implementations, the overall scores are normalized. Also, in some implementations, if an overall score for a particular set (either before or after normalization) is below a previously established threshold, then the set is discarded and not considered further as a possible system-suggested social circle.

The server device 112 then attempts to identify at least one of the remaining sets S to propose as a suggested social circle to the user. For example, in the illustrated implementation, the server device 112 starts with the set determined to have the highest overall score and checks the extent to which the set overlaps with the user's existing social circles (and/or any previously suggested social circles). If the server device 112 determines that there is not significant overlap between the particular set and the user's existing social circles (and/or any previously system-suggested social circles), then the particular set is proposed to the user as a system-suggested social circle.

To determine the extent of overlap between the particular set and the user's existing social circles (and/or any previously suggested social circles) the server device 112 compares the resemblance of the set to the user's existing social circles (and/or any previously suggested social circles) (366). In some implementations, the resemblance is defined as the ratio of the size of the intersection of the particular set and the user's existing social circles (and/or any previously suggested social circles) and the size of the union of the particular set and the existing social circles (and/or any previously suggested social circles). The server device 112 determines whether this ratio is larger than a predetermined threshold (e.g., 0.3) (368). If the ratio is larger than the predetermined threshold, it indicates that the particular set of contacts is quite similar to the user's existing social circles (and/or previously suggested social circles). In such a situation, the particular set of contacts is not proposed to the user as a system-suggested social circle. The server device 112 then considers a different set S having the next highest overall score (370), and the algorithm continues with block 366.

On the other hand, if the resemblance (i.e., the ratio of the intersection and the union) is equal to or less than the predetermined threshold (368), the server device 112 determines that the set S of contacts should be presented to the user as a system-suggested social circle (372).

The system-suggested social circle then can be presented to the user (374). For example, computer-executable instructions can be transmitted to a user computing device (e.g., as part of a web page) that, when executed, generate a graphical representation of the system-suggested social circle in a display (e.g., in a user interface of a website of a social networking service). As discussed in detail herein, the user can use each system-suggested social circle to distribute digital content to and receive digital content from other identified users associated with the suggested social circle. In some implementations, the suggested social circle can be presented to the user 200 who is then given the option of whether or not to accept the suggested social circle.

In some implementations, the process 350 of FIG. 4 can proceed to determine whether one or more additional social circles should be suggested to the user. In such situations, the process would proceed, for example, to consider the set having the next highest overall score (370) and perform the actions of blocks 366 and 368. The process may proceed either until a predetermined maximum number of social circles are suggested to the user or until all the remaining sets have been considered.

In the foregoing discussion of FIG. 4, the operations in the process 350 are described as being performed by a server device such as the server device 112. In other implementations, however, a different server device or processing device may perform part or all of the process.

Figure 5A:
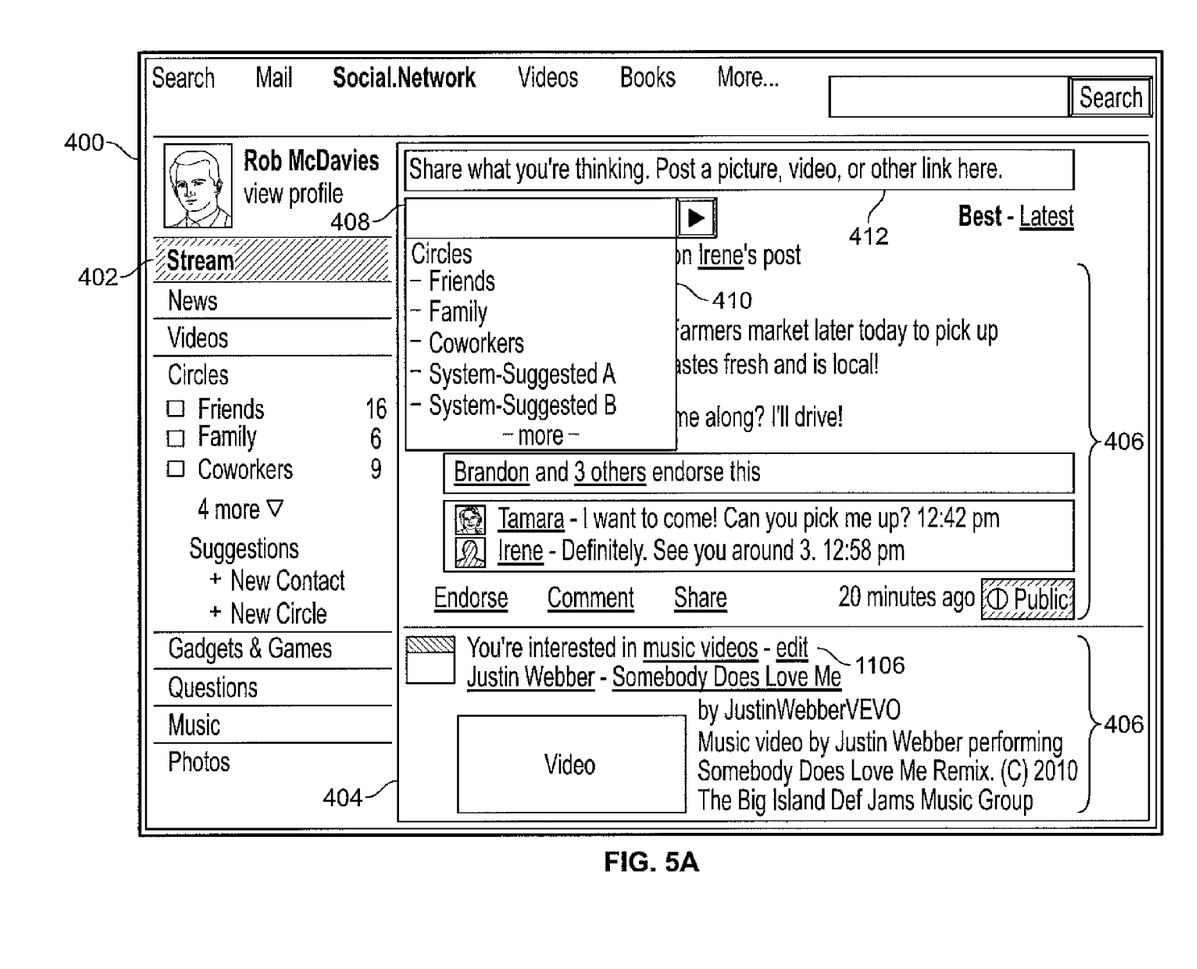
FIGS. 5A and 5B depict example stream pages for a user of a social networking service.
Figure 5B:
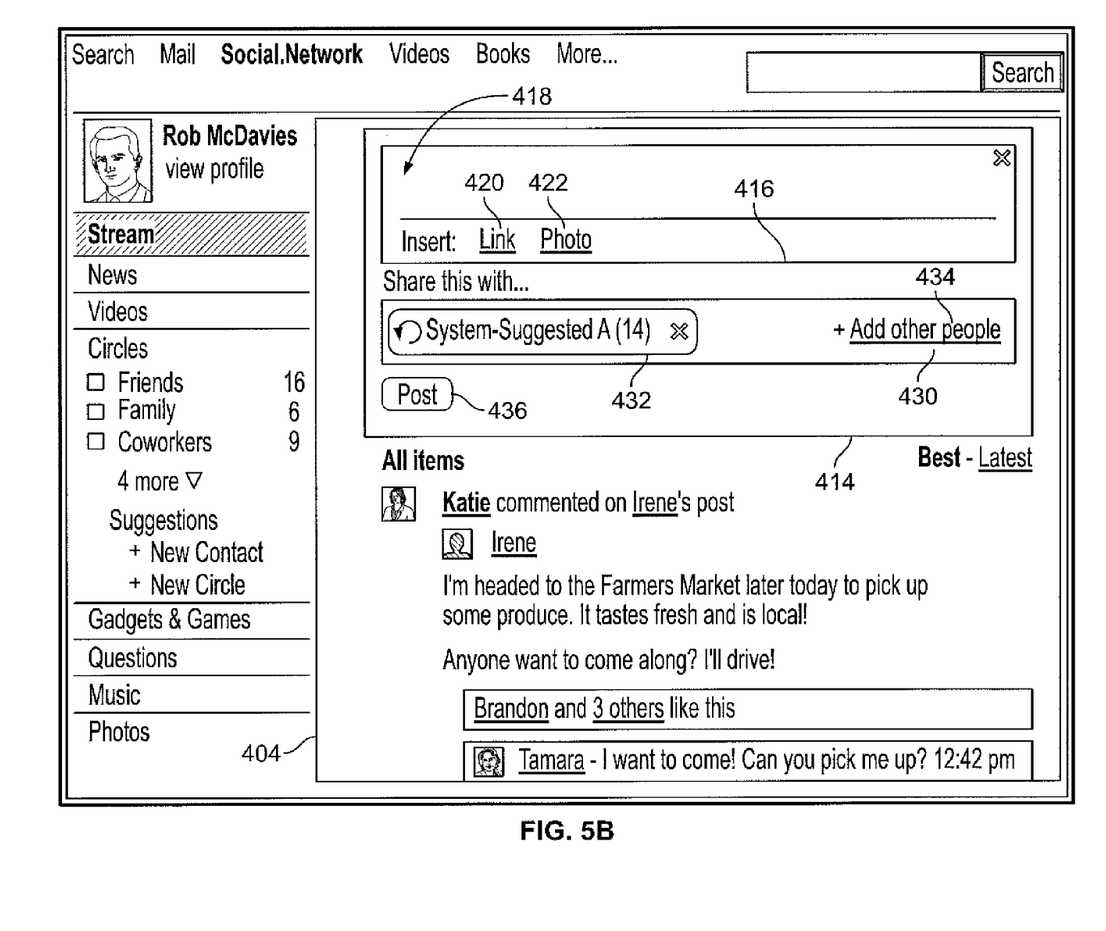

FIGS. 5A and 5B depict example stream pages for a user of a social networking service. FIG. 5A depicts an example stream page 400 for presenting digital content that has been distributed to the user (e.g., Rob McDavies). In some implementations, the stream page 400 can be displayed when a user selects a stream selector 402. In general, a stream frame 404 displays a listing of digital content 406 such as status updates, posts, digital images, digital video and/or links to digital content that has been received by the user through the social networking service.

The frame 404 can include a filter box 408 that the user can interact with to filter the source of the digital content. In the illustrated example, the user can click on the filter box 408 and a plurality of filter options 410 can be displayed to the user. In some implementations, the filter options 410 can include a list of social circles that can be used as filter criteria. For example, if the user selects "System-suggested," only digital content distributed to the user through system-suggested social circles is displayed to the user in the stream frame 404.

The stream page 400 can include a post input area 412. The user can click in the post input area 412, indicating an intent to post digital content to the social networking service. As discussed below with reference to FIG. 4B, the user can distribute digital content using the social networking service using through the post input area 412.

FIG. 5B depicts the stream page 400 after the user has clicked in the post input area 412. In the illustrated example, a post box 414 expands from the post input area 412 when the user selects the post input area 412. The post box 414 includes an input area 416. A post into a text region 418 of the input area 416 is provided into which the user can enter text. A link selector 420, when selected, presents an interface that assists the user with entering a hyperlink (e.g., a uniform resource indicator (URI)) to a resource (e.g., a web page). An image selector 422, when selected, presents an interface that assists the user with adding a digital image for distribution. Other selectors can be provided and can include, for example, a digital video selector and/or a location selector (e.g., that provides a link to a map).

The post box 414 includes a distribution dialog box 430. In some implementations, the distribution dialog box 430 provides an interface that enables the user to determine the distribution of the digital content. For example, the user may add or remove contacts, social circles, groups, or other identities from the distribution dialog box 430 to control who will receive the digital content. In the illustrated example, a system-suggested circle icon 432 (corresponding to "System-suggested Social Circle A" discussed above) appears in the distribution dialog box 430 to indicate that the digital content is intended to be shared with only users that are associated with the particular system-suggested social circle. An add link 434, when selected, presents an interface in which the user is able to select additional contacts and/or social circles to be added. A post button 436, when selected, causes the newly authored post including the selected digital content to be published and distributed through the social networking service.

In some implementations, continued membership in the circle may be dependent upon user behavior. For example, a user 204a-204l may be a member of, or may be offered to join, the social circle 240 only as long as the social networking system continues to determine that the user has maintained a threshold level of interactions with the user 202 during a particular time frame. Alternatively, if the user 204a-204i is already a member of the social circle 240, the social networking system may suggest that the user 202 revoke his membership, or his membership may be automatically revoked.

In some implementations, one or more default social circles can be provided or suggested to a user when the user subscribes to a social networking service. For example, "Friends," "Family," and "Coworkers" social circles can automatically be provided in a user's profile upon the user subscribing to the particular social networking service. Other social circles can automatically be provided including, for example, an "Acquaintances" social circle and/or a "Just Following" social circle. In some implementations, the automatically created or suggested social circles can include personal social circles. Although default social circles can be automatically provided, it may be left to the user to actually populate the default social circles with contacts. For example, each of the default social circles may initially be empty of contacts, and the user populates each of the default social circles.

As discussed herein, posts can be distributed to contacts within the social network including one or more social circles, such that they are exclusively viewable by the indicated contacts and/or contacts within one or more indicated social circles. For example, and as discussed previously, a user of the social networking service can generate a post and indicate one or more social circles for distribution of the post. In some implementations, an auto-complete component enables the user to type in part of the name of a social circle and/or individual contact to specify which social circles and/or individual contacts require delivery of the post content. During a post write-time, a post data set is transmitted from the user's client computing device (e.g., client device 102 of FIG. 1) to a distribution hub, which can be provided at a server (e.g., server device 112 of FIG. 1). The post data set includes a plurality of data. In some implementations, the post data set includes content data (e.g., text, uniform resource indicator (URI)), timestamp data (e.g., a timestamp indicating the time that the post was generated), distribution data (e.g., contacts and/or one or more social circles), and identification (ID) data (e.g., an ID assigned to the post data set upon generation of the post). In some implementations, the distribution data is processed to provide an access control list (ACL) that specifies which contacts within the social networking system are granted access to the post content. In some implementations, the distribution hub determines end points the post data set is to be distributed to based on the ACL. More specifically, the set of contacts that care about the post and/or that are allowed access to the post is determined based on the ACL and the ID of the post is written to a per user/view index at the distribution hub. When fetching posts to distribute to a user, the user/view index is accessed and the IDs of the various posts that the user is allowed to view are determined. The post data sets are retrieved from a data store (e.g., data store 118 of FIG. 1) and are transmitted to a client device associated with the requesting user.

In some implementations, a user need not explicitly join the system-suggested social circle as a member and can simply use the social circle as a distribution list (e.g., ACL) to distribute digital content. In some implementations, when distributing digital content using the suggested social circle, the user can allow certain information associated with the user to be made public to other users of the social circle. Example information can include a username, a profile picture and/or profile information. In some implementations, the user can explicitly join the suggested social circle, such that the user's identity within the social networking service may be made known to other users of the suggested social circle.

In some implementations, a user can add contacts to a system-suggested social circle. For example, a suggested social circle can be generated automatically and can be pre-populated with other users of the social networking service. The suggested social circle then can be presented to a user for distribution of digital content. In some examples, the user may determine that digital content should also be distributed to other contacts of the user within the social networking service. Consequently, the user can add known contacts to the suggested social circle.

In some implementations, a user automatically can receive content distributed by other users of the system-suggested social circle. For example, if the user is presented with a social circle (e.g., in a user interface of the social networking service), digital content distributed by other users of the social circle may be distributed and presented to the user without the user explicitly requesting to receive such digital content. In some implementations, the user can elect to not receive any digital content distributed by other users of the suggested social circle. For example, the user can provide user input through a user interface of the social networking service, the user input indicating that digital content distributed through the suggested social circle should not be distributed to the user. In short, the user can remove herself from the ACL underlying the suggested social circle. In some implementations, the user can elect to not receive any digital content distributed by one or more particular other users of the suggested social circle. For example, the user can provide user input through a user interface of the social networking service, the user input indicating that digital content distributed by a particular other user through the suggested social circle should not be distributed to the user.

In some implementations, a system-suggested social circle that is presented to the user for distribution of digital content can be locked from editing or modification by the user. For example, the user may be prevented from adding one or more contacts to the suggested social circle. As another example, the user may be prevented from removing one or more contacts from the suggested social circle. Instead, and in some implementations, the user can simply block digital content that is distributed by other users of the suggested social circle.

The system-suggested circles can incorporate privacy and visibility controls. In some implementations, membership in a suggested social circle can be voluntary. In some implementations, by joining or posting to a suggested social circle, the user may become visible to other members of the circle.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the invention can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementations are within the scope of the claims. For example, the actions recited in the claims can be performed in a different order and still achieve desirable results.

What is claimed is:

1. A system comprising:
   a processing device; and
   a data store coupled to the processing device and having instructions stored thereon which, when executed by the processing device, cause the processing device to perform operations comprising:

identifying contacts who previously have had interactions through one or more communications networks with a particular user during a specified period of time;

identifying different sets of contacts wherein each set consists of one or more of the identified contacts;

determining, for each of the sets, an initial score that represents a strength of the particular user's affinity to the set as a whole based on the interactions;

determining, for each member of each set, an individual score that represents an average strength of the particular user's affinity to the member based on the interactions;

calculating, for each of the sets, an overall score for the set based on the initial score for the set and the individual scores of each member in the set;

identifying, based on the overall scores of the sets, at least one of the sets for presentation as a suggested social circle to the particular user; and cause social circle data corresponding to the suggested social circle to be transmitted to display a representation of the suggested social circle on a client device associated with the particular user.

2. The system of claim 1, wherein the operation of identifying contacts who previously had interactions with the particular user during the specified period of time is based on interactions that included use of at least one of the following: an electronic post, an online forum, or a social networking website.

3. The system of claim 1 wherein the initial score increases as the number of times the particular user interacted with the set as a whole increases.

4. The system of claim 3 wherein interactions in which the particular user took an active role are weighted more heavily in determining the initial score than interactions in which the particular user did not take an active role.

5. The system of claim 3 wherein, when determining the initial score, more recent interactions are weighted more heavily.

6. The system of claim 3 wherein:
   interactions in which the particular user took an active role are weighted more heavily in determining the initial score than interactions in which the particular user has a passive role, and
   when determining the initial score, more recent interactions are weighted more heavily.

7. The system of claim 1 wherein the interactions include different types of interactions and wherein, when determining the initial score, each interaction is weighted based at least in park on the type of interaction it is.

8. The system of claim 1 wherein the individual score of a particular member of a set is based on a weighted sum of the initial scores for all the sets that include the particular member.

9. The system of claim 8 wherein the individual score for a particular member of a set increases as the number of times the particular user interacted with a set that contains the particular member increases.

10. The system of claim 9 wherein interactions in which the particular user took an active role are weighted more heavily in determining the individual score than interactions in which the particular user did not take an active role.

11. The system of claim 9 wherein, when determining the individual score of a particular member, more recent interactions are weighted more heavily.

12. The system of claim 9 wherein:
- interactions in which the particular user took an active role are weighted more heavily in determining the individual score than interactions in which the particular user did not take an active role, and
- when determining the individual score of a particular member, more recent interactions are weighted more heavily.

13. The system of claim 1 wherein the overall score for a set is based on a weighted average of the initial score for the set and the individual scores for each member of the set.

14. The system of claim 13 wherein the operations include:
- determining whether the initial score for a particular set is zero, and if so, then not calculating the overall score for the set and not further considering the set as a possible social circle to be suggested to the particular user.

15. The system of claim 13 wherein the operations include:
- determining an extent of overlap between a particular one of the sets and existing social circles for the particular user; and
- identifying the particular one of the sets for presentation as the suggested social circle only if the extent of overlap is determined to be less than a predetermined threshold.

16. The system of claim 15 wherein the extent of overlap is based on a ratio of (i) a size of intersection of the particular one of the sets and the particular user's existing social circles and (ii) a size of union of the particular one of the sets and the particular user's existing social circles.

17. The system of claim 15 wherein the extent of overlap is based on a ratio of (i) a size of intersection of the particular one of the sets and the particular user's existing social circles as well as social circles previously suggested to the particular user and (ii) a size of union of the particular one of the sets and the particular user's existing social circles as well as social circles previously suggested to the particular user.

18. A computer storage medium encoded with a computer program, the program comprising instructions that when executed by one or more computers cause the one or more computers to perform operations comprising:
- identifying contacts who previously have had interactions through one or more communications networks with a particular user during a specified period of time;
- identifying different sets of contacts wherein each set consists of one or more of the identified contacts;
- determining, for each of the sets, an initial score that represents a strength of the particular user's affinity to the set as a whole based on the interactions;
- determining, for each member of each set, an individual score that represents an average strength of the particular user's affinity to the member based on the interactions;
- calculating, for each of the sets, an overall score for the set based on the initial score for the set and the individual scores of each member in the set;
- identifying, based on the overall scores of the sets, at least one of the sets for presentation as a suggested social circle to the particular user; and
- causing social circle data corresponding to the suggested social circle to be transmitted so as to display a representation of the suggested social circle on a client device associated with the particular user.

19. The medium of claim 18, wherein the operation of identifying contacts who previously had interactions with the particular user during the specified period of time is based on interactions that included use of at least one of the following: an electronic post, an online forum, or a social networking website.

20. The medium of claim 18 wherein:
- the initial score increases as the number of times the particular user interacted with the set as a whole increases,
- interactions in which the particular user took an active role are weighted more heavily in determining the initial score than interactions in which the particular user has a passive role, and
- when determining the initial score, more recent interactions are weighted more heavily.

21. The medium of claim 18 wherein the interactions include different types of interactions and wherein, when determining the initial score, each interaction is weighted based at least in part on the type of interaction it is.

22. The medium of claim 18 wherein the individual score of a particular member of a set is based on a weighted sum of the initial scores for all the sets that include the particular member.

23. The medium of claim 22 wherein:
- the individual score for a particular member of a set increases as the number of times the particular user interacted with a set that contains the particular member increases,
- interactions in which the particular user took an active role are weighted more heavily in determining the individual score than interactions in which the particular user did not take an active role, and
- when determining the individual score of a particular member, more recent interactions are weighted more heavily.

24. The medium of claim 22 wherein the overall score for a set is based on a weighted average of the initial score for the set and the individual scores for each member of the set.

25. The medium of claim 13 wherein the operations include:
- determining an extent of overlap between a particular one of the sets and existing social circles for the particular user; and
- identifying the particular one of the sets for presentation as the suggested social circle only if the extent of overlap is determined to be less than a predetermined threshold.

26. The medium of claim 25 wherein the extent of overlap is based on a ratio of (i) a size of intersection of the particular one of the sets and the particular user's existing social circles and (ii) a size of union of the particular one of the sets and the particular user's existing social circles.

27. The medium of claim 25 wherein the extent of overlap is based on a ratio of (i) a size of intersection of the particular one of the sets and the particular user's existing social circles as well as social circles previously suggested to the particular user and (ii) a size of union of the particular one of the sets and the particular user's existing social circles as well as social circles previously suggested to the particular user.

28. A computer-implemented method comprising:
- identifying, by a server system, contacts who previously have had interactions through one or more communications networks with a particular user during a specified period of time;
- identifying different sets of contacts wherein each set consists of one or more of the identified contacts;
- determining, for each of the sets, an initial score that represents a strength of the particular user's affinity to the set as a whole based on the interactions;
- determining, for each member of each set, an individual score that represents an average strength of the particular user's affinity to the member based on the interactions;
- calculating, for each of the sets, an overall score for the set based on the initial score for the set and the individual scores of each member in the set;

identifying, based on the overall scores of the sets, at least one of the sets for presentation as a suggested social circle to the particular user; and causing social circle data corresponding to the suggested social circle to be transmitted to display a representation of the suggested social circle on a client device associated with the particular user.

\* \* \* \* \*